July 8, 1958      J. S. MILLER      2,841,871
DENTURE MAKING EQUIPMENT
Filed Dec. 16, 1954      5 Sheets-Sheet 1
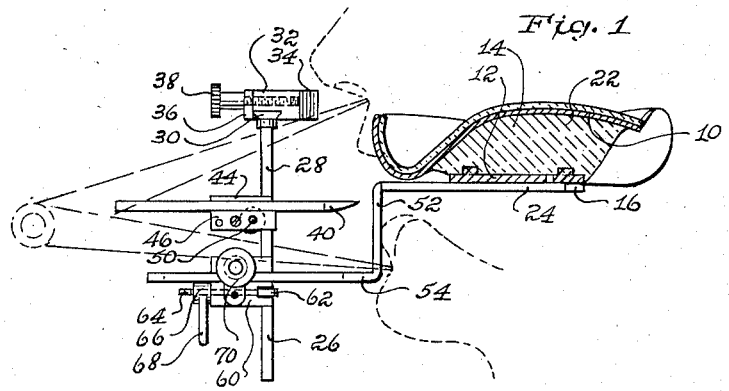
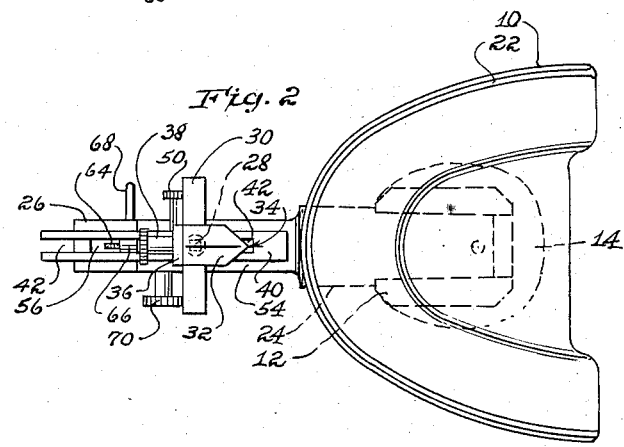
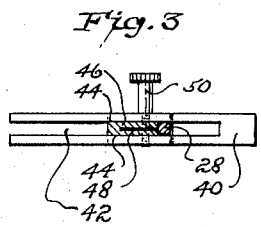
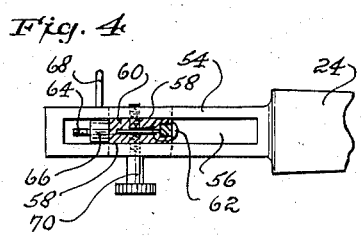
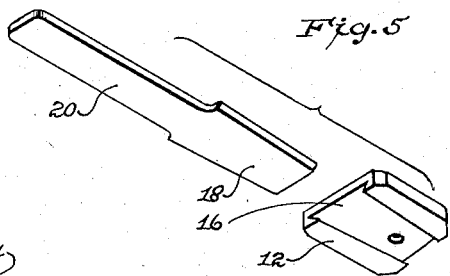
James S. Miller
INVENTOR.
BY *J. W. Nells*
ATTORNEY July 8, 1958 J. S. MILLER 2,841,871
DENTURE MAKING EQUIPMENT
Filed Dec. 16, 1954 5 Sheets-Sheet 2

James S. Miller
INVENTOR.

BY
ATTORNEY

July 8, 1958     J. S. MILLER     2,841,871
DENTURE MAKING EQUIPMENT
Filed Dec. 16, 1954     5 Sheets-Sheet 3
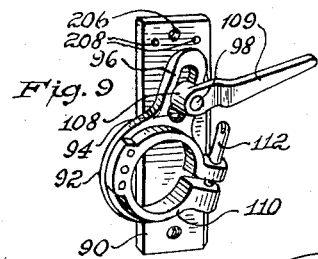
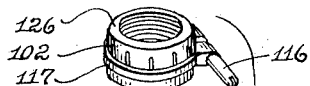
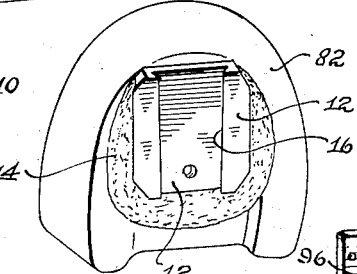
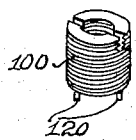
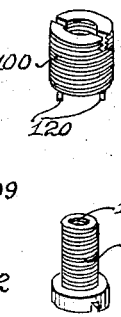
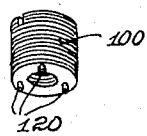
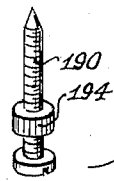
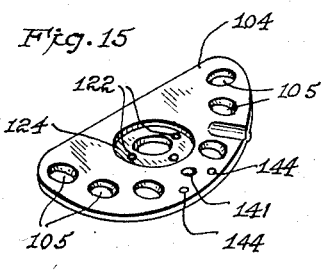
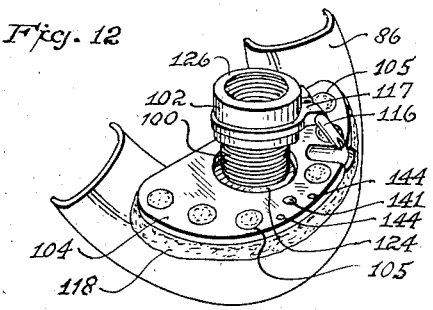
James S. Miller
INVENTOR.
BY J. W. Mills
ATTORNEY

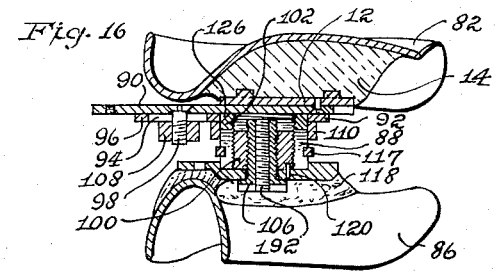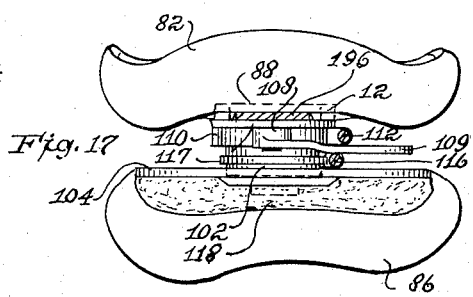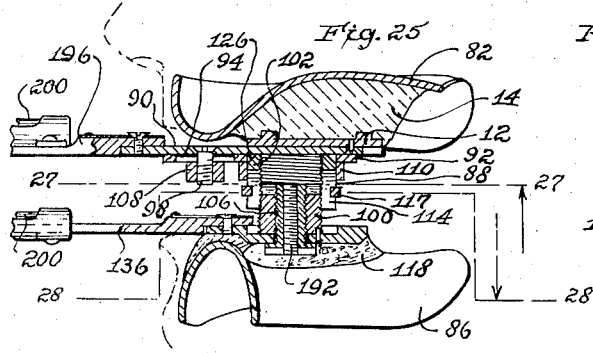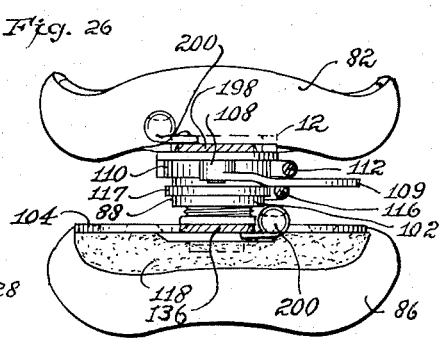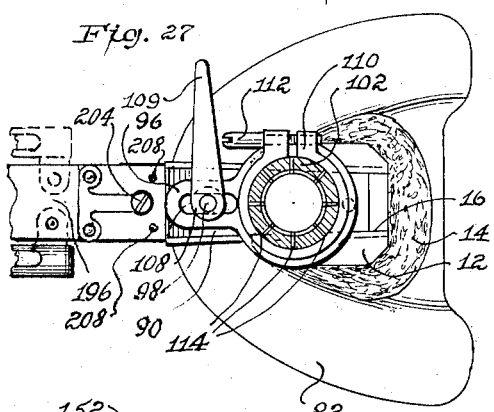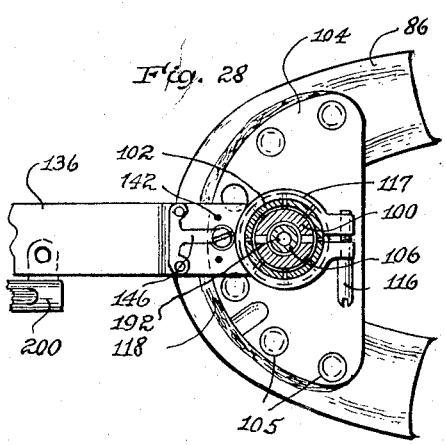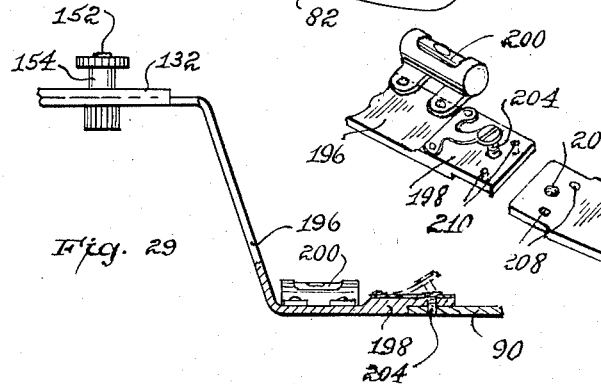

July 8, 1958    J. S. MILLER    2,841,871
DENTURE MAKING EQUIPMENT
Filed Dec. 16, 1954    5 Sheets-Sheet 5
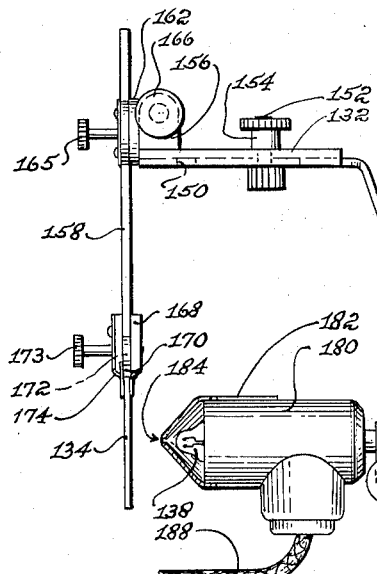
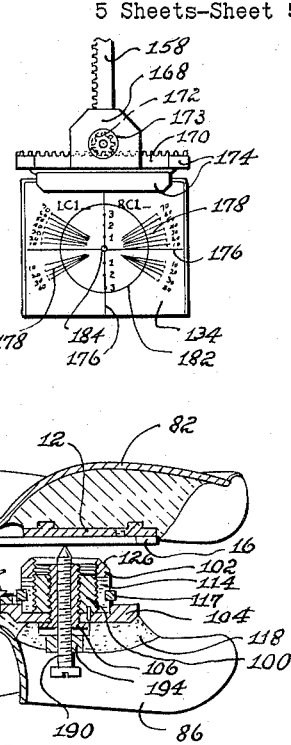
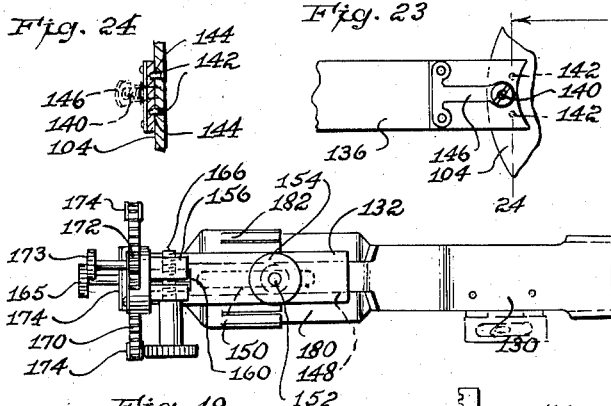
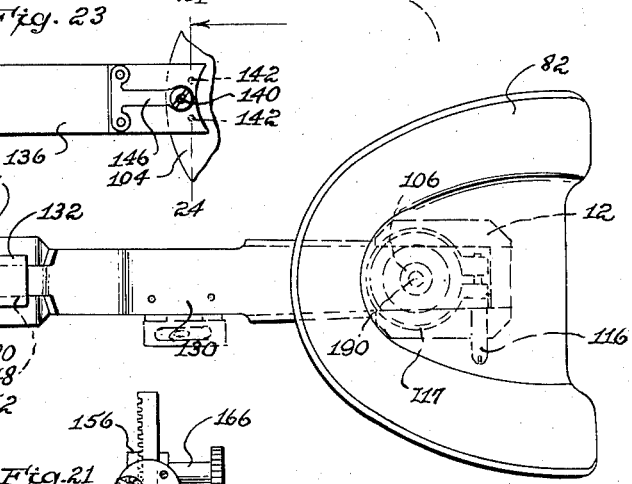
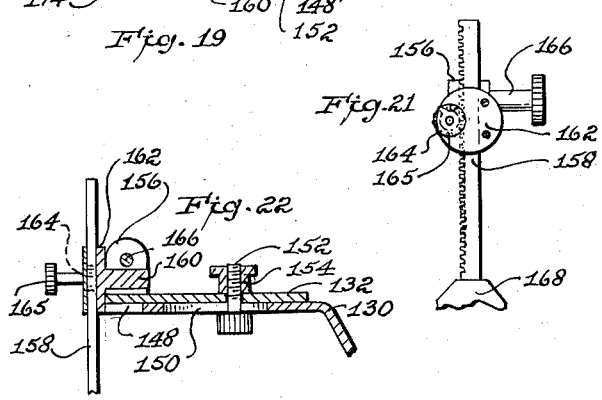
James S. Miller
INVENTOR.
BY
ATTORNEY

United States Patent Office 2,841,871
Patented July 8, 1958

2,841,871

DENTURE MAKING EQUIPMENT

James S. Miller, Morrisville, Pa.; Florence F. Miller and Helene M. Deitz, executrices of the estate of said James S. Miller, deceased Application December 16, 1954, Serial No. 475,689

7 Claims. (Cl. 32—19)

This invention relates to denture making equipment and its purpose is to provide means for the precise accomplishment of a number of objects in the making of artficial dentures in addition to those set forth in my copending application Serial No. 434,292, filed June 3, 1954, now Patent Number 2,720,026. In the present invention, I utilize certain of the features incorporated in my above mentioned application, particularly the same type of articulator having artificial condyles, an upper base plate provided with a special handle and a holder therefor cooperative with the articulator and devices associated therewith for producing and maintaining the base plate in level relation during the procedure of making the upper denture models, and also the final pulverized stone denture model formed as set forth in the application referred to.

Among the important objects of my present invention is to provide an adjustable instrument in combination with an upper base plate in the mouth of a patient for whom artificial dentures are to be made for establishing the lip line and the median line of the patient.

Another object of this invention is to provide means in combination with the same upper base plate and an articulator for transferring the established lip line and median line from said adjustable instrument to a final denture model mounted on said articulator.

A further object of the invention is to provide apparatus in combination with upper and lower base plates in the mouth of a patient for establishing by means of a ray of light the degree of inclination of each of the condyles of the patient so that the inclinations so established can be set up on artificial condyles of an articulator.

Another object of the present invention is to provide means in combination with upper and lower base plates in the mouth of a patient for establishing centric occlusion of the patient.

A further object of my invention is to provide adjustable means in combination with upper and lower base plates in the mouth of a patient of establishing the vertical relation between the mandible and maxilla.

A still further object of the present invention is to provide handles for the several devices mentioned which are interchangeable in a single holder fixedly attached to an upper base plate.

Heretofore it has been a customary procedure for dentists to undertake to establish the lip line, median line and vertical relation of a patient by means of wax and plastic compound applied to the upper and lower base plates. My invention not only eliminates the need for the use of wax or compound but also enables a dentist to perform the essential functions mentioned mechanically with a far greater degree of accuracy than has been possible with previous equipment and methods.

Further objects and advantages of my improved equipment will be apparent from the following specification taken in connection with the accompanying drawings to which reference is directed, in which:

Fig. 1 is a view in side elevation of my improved instrument for establishing the lip line and the median line, and also showing in section an upper base plate and handle holder of the construction shown and described in my copending application Serial No. 434,292;

Fig. 2 is a top plan view of the instrument, base plate and handle holder shown in Fig. 1;

Fig. 3 is a plan view of the lip line indicator with its support shown in section;

Fig. 4 is a plan view of the outer end portion of the handle member for the instrument shown in Figs. 1 and 2;

Fig. 5 is a perspective view of the handle holder in Figs. 1 and 2 and also of a handle of a construction shown in my above mentioned co-pending application;

Fig. 9 is a perspective view of one member of an adjustable unit for locking the upper and lower base plates together in centric occlusion and in proper vertical relation;

Fig. 10 is a perspective view of an upper base plate with the handle holder shown in Figs. 1, 2, 5, 6, and 7 fixedly attached thereto by means of plastic compound;

Fig. 11 is a perspective view showing the handle element of the member shown in Fig. 10 inserted in the above mentioned handle holder;

Fig. 12 is a perspective view of additional members of the above mentioned adjustable unit attached by means of plastic compound to the lower base palte;

Figure 6:
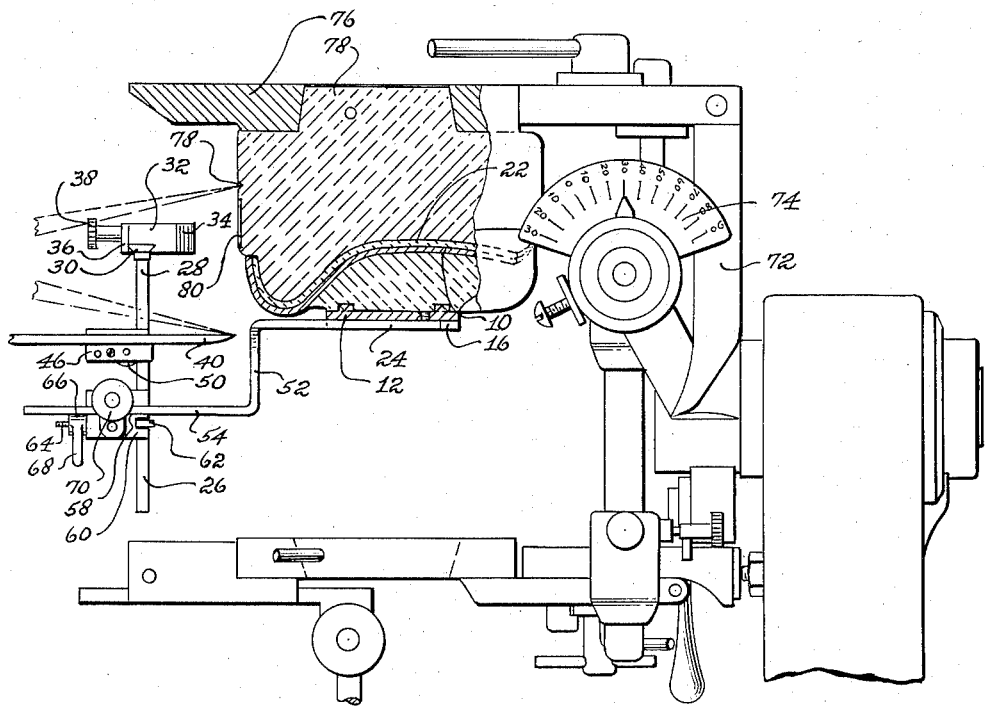
Fig. 6 is a side elevation of an articulator of the construction shown in said co-pending application, and showing the arrangement for transferring the lip line and the median line from the adjustable instrument shown in Fig. 1 to the final pulverized stone denture model mounted on the articulator.
Figure 7:
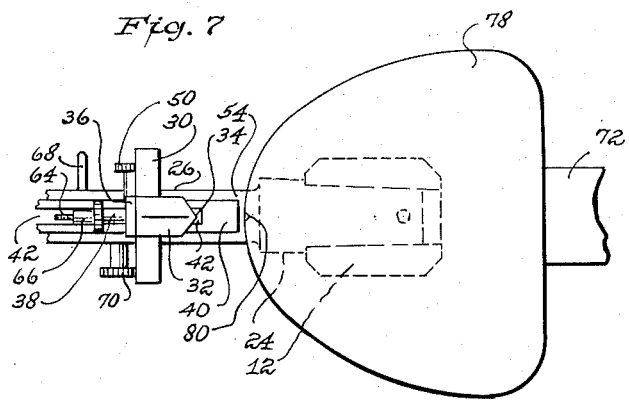
Fig. 7 is a top plan view of the final model with the adjustable instrument applied thereto.

Fig. 13 designates perspective views of certain threadedly adjustable elements included in the above mentioned adjustable unit;

Fig. 14 is a perspective view of the screw effecting vertical adjustment of the upper and lower base plates, as viewed from the bottom;

Fig. 15 is a perspective view of a support member for anchoring the vertically adjusting screw shown in Fig. 14 to the lower base plate, as indicated in Fig. 12;

Fig. 16 is a sectional view in side elevation of the adjustable unit shown in Figs. 9 to 15 attached to the upper and lower base plates in assembled and retracted relation;

Fig. 17 is a front elevation of the assembly shown in Fig. 16;

Fig. 18 is a view in side elevation, partly in section, of devices attached to the upper and lower base plates in the mouth of a patient for establishing the degree of inclination of each condyle and centric occlusion of the patient by means of a ray of light;

Fig. 19 is a top plan view of the assembly shown in Fig. 18;

Fig. 20 is a front view of a transparent screen, carried by the upper base plate and upon which the ray of light is initially centered;

Fig. 21 is a view of the rack and pinion arrangement for vertical adjustment of the screen shown in Fig. 20;

Fig. 22 is a sectional view of the means for horizontal adjustment of the screen;

Fig. 23 is a plan view of the end of the electric light support shown in Fig. 18;

Fig. 24 is a section taken on the line 24—24, of Fig. 23;

Fig. 25 is a sectional view similar to Fig. 16, but showing the unit in partially extended vertical relation in the mouth of a patient;

Fig. 26 is a front elevation of the assembly shown in Fig. 25;

Fig. 27 is a bottom plan sectional view taken on the line 27—27 of Fig. 25;

Fig. 28 is a top plan sectional view taken on the line 28—28 of Fig. 25;

Fig. 29 is a side elevation, partly in section, showing a modified form of screen holder handle for determining whether the vertically and angularly, or horizontally, adjusted assembly shown in Fig. 25 is in centric occlusion; and Fig. 30 is a perspective view showing the securing end of the screen holder handle shown in Fig. 29 and also the projecting and tapered end of the handle element of the member of the adjustable unit shown in Figs. 9, 11, 16 and 25.

Referring to the drawings in which like numerals designate like parts in the several views, as already mentioned, an upper base plate 10 made in accordance with the procedure illustrated and described in my co-pending application Serial No. 434,292, or by other suitable methods, is fixedly attached to a handle holder 12, by means of plastic compound 14 or other suitable material. This holder may be provided with a dovetailed groove 16 tapered from its entrance end to receive the tapered and beveled end portion 18 of a handle 20 (Fig. 5) in a tight fit. Other handle elements employed in connection with the improved equipment hereinafter described may be tapered and beveled for interchangeable attachment to the holder 12.

As a first step in the procedure to be described the handle 20 is inserted in the holder 12 of the upper base plate 10 and an impression 22 in suitable plastic material (Figs. 1 and 6) taken from the mouth of a patient for whom artificial dentures are to be made. When the impression material hardens the handle 20, is removed from the holder 12 in the base plate and the handle 24 of an adjustable instrument 26 (Figs. 1 to 4 and 6) for establishing the lip line and the median line of the patient is inserted in its place in the holder. The instrument referred to comprises a post 28 having mounted upon its upper end a horizontal bar 30 with opposed beveled edges. Slidably mounted on this bar is a median line indicator 32 provided with a tapered front end 34. This indicator may be slidably adjusted along the bar and clamped in adjusted position by means of a movable block 36 and a screw 38. A horizontally disposed lip line indicator 40 is provided with a central longitudinal slot 42 by means of which the indicator is slidably mounted in horizontal grooves 44 formed in a support 46 which is vertically adjustable on the post 28. This support is split from its front end toward the rear as indicated at 48 and a screw 50 may be employed to clamp it in vertically adjusted position. The handle 24 has a depending portion 52 terminating in a horizontal and rearwardly extending portion 54. This extending portion is provided with a central slot 56 by means of which it is slidably mounted in horizontal grooves 58 formed in a support 60 which also is vertically adjustable on the post 28. The support 60 may be clamped in vertically adjusted position by means of a yoke 62 attached to a threaded shank 64 and a nut 66 provided with a handle 68. Also the handle portion 54 may be clamped in horizontally adjusted position by means of screw 70.

The lip line indicator 40 is brought toward the upper lip to whatever length the dentist desires to have the upper teeth and locked in position. The median line indicator is placed in the center of the septum of the nose (shown dotted) and locked in position. The instrument 26 is then removed from the holder 12 in the base plate 10 and replaced with the handle 20 with which handle the base plate together with the impression therein is removed from the mouth and leveled off in the articulator 72, which is provided with artificial condyles 74 by means of which the condylar inclinations of a patient, established by means of a ray of light, or other suitable means, may be set up so that the movements of the lower jaw can be duplicated on the articulator. A pulverized stone, final upper denture model 78 is then made from the impression 22 in base plate 10 and this model mounted on the upper member 76 of the articulator by means of the handle 20.

The handle 20 is then removed and the handle 24 of the lip line and median line indicator instrument 26 is then again inserted in the holder of the upper base plate 12, as shown in Fig. 6. This distance between the adjusted lip line indicator and some point on the front of the stone model is measured, as for example with a pair of dividers and a mark or indentation 78 made on the model at the top point of the dividers. The distance between the points is then marked on the patient's examination chart for subsequent reference when the artificial teeth are to be set up on the model. The median line may be marked on the model by a line or indentation as indicated at 80. After the lip and median lines have been marked on the stone model and on the examination chart the base plate 10 is stripped from the model. A new upper base plate 82 (shown in Figs. 10, 11, 16, 17, 18, 19, 25, 26, and 27) is then made on the stone model 78 and the same handle holder 12 attached to that base plate. In all the above described operations no wax or compound is used except in making the impression 22 and in attaching the handle holder 12 to the base plates 10 and 82.

Figure 8:
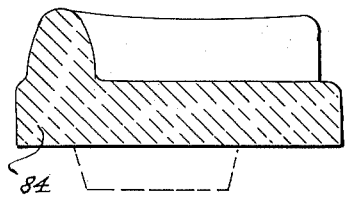
Fig. 8 is a sectional view of a lower denture model.

An impression is made of the lower portion of the mouth in a lower base plate (not shown) and the lower pulverized stone model 84 (Fig. 8) made on this model. The base plate is then stripped from this model and a new lower base plate 86 (shown in Figs. 12, 16, 17, 18, 25, 26 and 28) made on the model.

The next step in the procedure is to assemble a vertically and horizontally adjustable unit 88 on the upper and lower base plates 82 and 86 as shown in Fig. 16. The handle 90 of the horizontally adjustable member 92 of this unit (Fig. 9) is inserted in the handle holder 12, as shown in Fig. 11, and the member 92 adjusted so that the slot 94 in the arm 96 is in substantial central alignment with the handle 90 and with the threaded lock pin 98 positioned midway between the ends of the slot, as shown in Fig. 27, to permit the maximum desired movement of the member 92 in either direction. The lower members, including a relatively large screw 100 and a threaded abutment or nut 102, are then attached to a flat support member 104 (Fig. 15) by means of a screw 106 which is axially threaded in the screw 100. The nut 102, with screw 100 and support member 104 attached in retracted relation, is loosely inserted in the split ring nut holder 110 of the member 92 with the end of the nut abutting the handle 90, as shown in Fig. 16. The member 92 is then locked to the handle 90 by means of the threaded lock pin 98 and lock nut 108, having a lever handle 109. The split ring holder 110 is clamped to the nut 102 by means of a screw 112; and the nut 102, which is provided with annularly spaced slits 114 in its lower portion to permit contraction is clamped to the screw 100 by means of a screw 116 and split ring 117. With all the members of the unit 88 in locked relation, as described, plastic compound 118 is applied to the upper surface of the lower base plate 86. The two attached base plates are placed in the mouth of the patient and the patient is then instructed to close the mouth. This presses the flat support member 104 into the compound 118 thereby fixing this support member to the lower base plate 86 in horizontal relation. The plastic compound is pressed through the flared openings 105 thereby more securely anchoring the member 104 to the base plate. Then the three locking members 108, 112 and 116 are loosened, thereby leaving the nut holder 110 loosely attached to the handle 90, as shown in Fig. 9, and the screw 100, with the nut 102 in adjustable relation, attached to the lower base plate 86, as shown in Fig. 12. Projecting pins 120 in the bottom end of the screw 100 fit in holes 122 in the bottom of a recess 124 on the support member 104 to insure that when the screw 100 is removed with other members in locked relation, such members will be replaced on the member 104 in the same relative position. It is also to be noted that the upper end of the nut 102 is slightly chamfered or rounded, as indicated at 126 for guiding the nut into the ring 110. The handle may be fastened to the handle holder 12 by means of a screw 128.

The horizontally adjustable member 92 is removed from the handle holder 12, and the handle 130 of a screen holder 132, to which a screen 134 is attached, is inserted in the holder 12, as shown in Fig. 18. An electric light holder 136, to which an electric light 138 is attached, is secured at one end to the front edge of the support member 104 by means of a screw 140 threaded into an opening 141.

The bottom of the light holder is provided with a pair of transversely spaced, depending pins 142, which fit in openings 144 in the front edge of the member 104 to position the light holder in right angular relation with the front of the base plates 82 and 86. The screw 140 may be rotatably attached to a flat spring 146 secured at its rear end to the light support and outwardly urged at its other end which carries the screw, so that the screw will be held in lifted position when unscrewed from the opening 141 in the member 104, but in registering position for insertion therein, as indicated in dotted lines in Figs. 18 and 24. The handle 130 is bent upwardly and outwardly and the outwardly and horizontally extending end portion is of reduced width and slidably mounted in a groove 148 in the screen holder 132. The reduced end portion of the handle is provided with a longitudinal slot 150, more clearly shown in Fig. 22, and the handle and screen holder may be clamped together in any desired longitudinally adjusted position by means of a shouldered screw 152, which projects through the member 132 and the slot 150, and a nut 154.

The outer end of the screen holder 132 is provided with a split socket member 156 disposed in longitudinal alignment therewith. A vertical rack 158 to which the screen 134 is attached is removably anchored to the holder 132 by means of a pin projecting into the socket 156 from a rack guide 162 in which is journalled a pinion 164 through which the screen 134 can be vertically adjusted, the pinion being provided with a handle 165. The pin 160 is clamped in the socket 156 by means of a shouldered screw 166. The lower end of the rack 158 (Fig. 20) carries another rack guide 168 in which is mounted a horizontally movable rack 170, which is movable in either direction by means of a pinion 172 provided with a handle 173. This rack is attached to the screen 134 by any suitable means, such for example, as a bracket 174. The screen, which may be made of any transparent material has across its face intersecting lines 176 and also lines 178 indicating various angles. The electric light bulb 138 is carried in a closed cylindrical casing 180, having a slidable and pointed front end portion 182, in the extreme end of which is a small opening 184. The rear end of the casing has a ball joint connection 186 with the holder 136, so that the point of the casing is laterally adjustable in any direction. Electric current for the light may be supplied through conductor wires 188 connected to any convenient electric outlet. A pivot screw 190 is inserted in a central threaded opening 192 in the screw 106, with its pointed end projecting through the screw 106 beyond the end of the nut 102 and locked in that position by means of a lock nut 194.

The base plates 82 and 86 together with the lower members of the adjustable unit 84 attached to the lower base plate, the electric light holder and the screen holder are placed in the mouth of the patient, as shown in Fig. 18, with the point of the pivot screw 190 abutting the handle 130 of the screen holder to provide for universal tilting of the lower base plate. The light 138 which is back of the screen 134 is then centered at the junction of the intersecting lines 176 of the screen, and the patient directed to open and close the mouth two or three times. If the ray of light passing through the small opening 184 falls on the intersection of the lines the mandible or lower jaw is in centric occlusion (meaning that the condyles are in the most posterior in the glenoid fassa). The patient is instructed to move the lower jaw to the left and the ray of light moves with it indicating on the lines of the screen the degree of inclination of the condyle of the patient on the right side. The patient is then directed to move the lower jaw to the right indicating on the screen the degree of inclination of the condyle on the left side. The condylar inclinations established as above described are recorded on the examination card of the patient, and subsequently set up on the artificial condyles 74 of the articulator 72 (Fig. 6), so that the movements of the lower jaw of the patient can be duplicated on the articulator.

Referring particularly to Figs. 25, 26, 27 and 28 the next step in the use of my improved equipment, the structural details of which have already been described, is to establish the vertical relation between the upper and lower jaws of a patient by means of the complete adjustable unit 88 assembled on the upper and lower base plates and in the mouth of the patient. As a guide in making the necessary vertical adjustments in the unit the dentist will first determine with the cooperation of the patient the normal rest position of the lower jaw of the patient, which may be accomplished before placing the unit 88 in the mouth. When the patient has permitted the lower jaw to come to rest position the dentist with a skin pencil will mark a point below the nose and above the chin of the patient, and the distance between the marks measured as, for example, with a pair of dividers, as indicated in dotted lines on Fig. 1, or by any other suitable instrument. The distance will be recorded on the examination card of the patient. The dentist will then calculate the vertical difference in distance between the rest position and the occlusion position of the lower jaw, using his knowledge and judgment and making proper allowance for variation corresponding to the age of the patient. Another mark will then be made at a point a sufficient distance below the first upper mark to represent the difference between the rest and occlusive positions of the lower jaw.

In mechanically adjusting the upper and lower base plates 82 and 86 to the correct vertical relation the upper base plate 82 with the horizontally adjustable member 92 and its associated parts attached, as shown in Fig. 11, and the lower base plate 86, with the screw 100 and nut attached, as shown in Fig. 12, are separately placed in the mouth of the patient, thus assembling the complete vertical adjusting unit 88, as shown in Fig. 25. However, before the plates are inserted in the mouth the lock nut 108 and the clamping screws 112 and 116 will be loosened, and the pivot screw 190 will be withdrawn or removed from the screw 106, so that the end of the nut 102 will bear directly against the handle member 90 within the split ring member 110, as shown in Fig. 25. The dividers will be adjusted to span the distance between the mark immediately above the chin and the second mark below the nose of the patient, previously mentioned, and the dentist, guided by the adjusted dividers, and with the patient alternately opening and closing the mouth according to his instructions will vertically adjust the nut 102 until he finds that the points of the dividers coincide with the mark above the chin and the second upper mark. It should be understood that each time the mouth is closed the gums of the patient will bear firmly against the inner surfaces of the base plates 82 and 86. It should also be understood that during the vertical adjustments mentioned the split ring nut holder 110 with its attached member 92 is free to move horizontally in any direction on the threaded lock pin 98. Therefore, repeated opening and closing of the mouth will cause the cylindrical nut 102 to find its exact center in the nut holder 110. When the vertical adjustments are completed, as described, the dentist will tighten the screw 116 to clamp the nut 102 to the screw 100. This leaves the lock nut 108 and the screw 112 still loosened so that the member 92 and the nut holder 110 will be free to move in any horizontal direction and the nut 102 free for vertically slidable movement within the nut holder 110.

Before the nut 108 and the screw 112 are tightened an inspection by means of the screen 134 and electric light 138 may be made to determine whether the mandible is in precisely centric occlusion in the following manner The screen 134 and electric light 138 are again installed on the base plates 82 and 86 in the same relative positions as those indicated in Fig. 18. The same light fixture and handle 136 are used in this second installation, as indicted in Figs. 25 and 26. However, since it is necesary that the handle member 90 be in the holder 12 during this operation, the screen holder handle 130 may be replaced with a form of handle 196, illustrated more clearly in Figs. 29 and 30. This handle is provided with a shouldered end portion 198 which fits over the projecting end of the handle member 90 and is securely attachable thereto by means of a screw 204 threaded into an opening 206 in the end portion of the handle member 90. This handle member is also provided with small openings 208 into which depending pins 210 in the end of the handle member 196 are inserted for the purpose of positively aligning the handle member 196 with the handle member 90, in the same general manner in which the light holder handle 136 is aligned with the holder 12. A level 200 may be attached to each of the handles 136 and 196, in laterally offset relation as shown in Fig. 26. The levels are previously leveled with the handles 136 and 196 in the articulator 72 so that the dentist will be assured that when the handles 136 and 196 are in level position in the operation shown in Fig. 25 the mandible and maxilla are in proper vertical relation. After the installation of the screen and light is completed as described, the patient is instructed to open and close the mouth two or three times. If the light falls on the intersection of the lines 176 the mandible is in centric occlusion. Also if the levels show the handles 136 and 196 to be in level position the dentist will know that the mandible and maxilla are in proper vertical relation. Then, with the mouth of the patient firmly closed, the dentist will tighten the lock nut 108 and the screw 112 thereby clamping the member 92 and the split ring nut holder 110 to the handle member 90, and clamping the ring 110 to the nut 102. This completes the procedure of establishing the vertical relation and centric occlusion, and the base plates can then be removed from the mouth of the patient in rigidly connected relation for use in making artificial dentures for the patient.

Since the operation illustrated in Fig. 18 can be accomplished with the horizontally adjustable member 92 in the mouth of the patient, the dentist may, if desired, dispense with the screen holder handle 130.

In addition to aiding in determining the vertical relation and centric occlusion, another particularly advantageous use of the two levels 200, when mounted on the handles 136 and 196, is in the adjusting of the elements of the unit 88, since, as already mentioned, when such adjustments bring the two handles into a level position the vertical adjustments will be correct. First the head of the patient, in the dental chair with both base plates and the elements of the unit 88 in the mouth, will be leveled by the dentist to bring the upper handle into a level position. The unit 88 will then be adjusted to bring the lower handle into a level position. Therefore, correct adjustments to the vertical relation of the mandible and maxilla can thus be accurately made with the aid of the two levels, as illustrated, without the use of dividers as a guide in making such adjustments.

Although it is contemplated that the base plates 82 and 86 will be removed from the mouth of the patient in vetrically adjusted and rigidly connected relation and the stone models 78 and 84 fitted into the base plates on the articulator 72 while being maintained in the same adjusted and connected relation, the operations of fitting the models into the base plates are well known in the profession and form no part of my present invention. Therefore, such operations are not illustrated and described herein.

From the foregoing description it will be seen that I have provided novel, but quite simple equipment cooperative with upper and lower base plates 10, 82 and 86 and particularly with handle holder 12 attached to upper base plates 10 and 82 by means of which all guesswork and the use of wax for the so-called "bite" in the establishing of the lip line, median line, vertical relation between the maxilla and mandible and centric occlusion by means of a ray of light, and the accurate transfer of such characteristics to artificial dentures for the patient is effectively eliminated.

Obviously, changes in the construction of the various members of my improved equipment may be made without departing from the spirit and scope of my invention. Therefore, it should be understood that the construction of the elements shown and described are intended to be illustrative, only, and not limited to such specific construction.

I claim:

1. In equipment of the character described in combination with upper and lower base plates formed from an impression in plastic material taken from the mouth of a patient for whom artificial dentures are to be made, relatively flat supports attached to the backs of said plates in substantially horizontal and parallel relation, a device for establishing the vertical relation between the maxilla and mandible including a relatively large screw secured to said lower base plate by means of an axially extending smaller screw having a head bearing against tthe bottom of the flat support on said plate, a flat handle member provided with means for attaching it to the flat support on said upper base plate a split ring nut holder mounted on said handle member for movement in any horizontal direction, and screw means for locking said nut holder in fixed position on said handle member, a vertically slitted and adjustable nut on said larger screw adapted to enter said nut holder and bear against said handle member, screw means for clamping said nut holder about said nut, and screw means for clamping said nut about said larger screw.

2. A device according to claim 1 in which said nut is chamfered at its upper end to facilitate its entrance into said split ring nut holder.

3. A device according to claim 1 including a handle for a screen support having at its front end means for attachment to the front end portion of the handle member for said split ring nut holder.

4. A device according to claim 1 in which the screw means for clamping the nut to the larger screw comprises a split yoke embracing said nut and a transverse screw therein for closing said split yoke about said nut and screw.

5. A device according to claim 1 in which the means for locking the split ring nut holder in fixed position on the handle member comprises a ring support to which said holder is secured, an arm having therein a longitudinal slot carried by said support, a headed and threaded lock pin projecting through said handle member and slot, and a nut on the end of said lock pin for clamping said holder support to said handle member.

6. In equipment of the character described in combination with upper and lower base plates formed from an impression in plastic material taken from the mouth of a patient for whom artificial dentures are to be made, relatively flat supports attached to the backs of said plates in substantially horizontal and parallel relation, a device for establishing the vertical relation between the maxilla and mandible including a relatively large screw secured to said lower base plate by means of an axially extending smaller screw having a head bearing against the bottom of the flat support on said plate, a vertically slitted and adjustable nut on said larger screw adapted to bear against the flat support on said upper base plate for slidable movement thereon in any horizontal direction, means for securing said nut against horizontal movement relative to said flat support; and screw means for clamping said split ring about said nut.

7. Equipment according to claim 1 in which the small headed screw extending through the relatively large screw is provided with an axial screw threaded opening extending therethrough and including an axially adjustable screw extending through said opening, said screw having a pointed upper end adapted to bear against the upper base plate in such a manner as to permit universal tilting thereon of the lower base plate.

References Cited in the file of this patent

UNITED STATES PATENTS

| | | |
|---|---|---|
| 2,119,823 | Miller et al. | June 7, 1938 |
| 2,204,809 | Miller et al. | June 18, 1940 |
| 2,389,063 | Lang | Nov. 13, 1945 |